United States Patent
Taniguchi

(10) Patent No.: US 6,831,445 B2
(45) Date of Patent: Dec. 14, 2004

(54) AUTOMOTIVE ALTERNATOR HAVING PARALLEL CONNECTED CIRCULATING CIRCUIT TO RAPIDLY ATTENUATE FIELD CURRENT

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 43 days.

(21) Appl. No.: 10/300,832

(22) Filed: Nov. 21, 2002

(65) Prior Publication Data
US 2003/0107350 A1 Jun. 12, 2003

(30) Foreign Application Priority Data

Dec. 6, 2001 (JP) ....................... 2001-373238
Dec. 6, 2001 (JP) ....................... 2001-373239

(51) Int. Cl.[7] .............. H02P 9/08; H02P 9/30; H02J 7/24; H02J 7/14; H02H 7/06
(52) U.S. Cl. ............. 322/28; 322/25; 322/20; 290/9; 318/254
(58) Field of Search .............. 322/28, 25, 20; 318/434, 254, 52; 290/9; 361/20

(56) References Cited

U.S. PATENT DOCUMENTS

| | | | | |
|---|---|---|---|---|
| 3,584,282 A | * | 6/1971 | Reeves et al. | 388/821 |
| 3,737,745 A | * | 6/1973 | Chevaugeon et al. | 318/52 |
| 3,820,009 A | * | 6/1974 | Itoh et al. | 322/28 |
| 3,868,554 A | * | 2/1975 | Konrad | 318/434 |
| 4,143,280 A | * | 3/1979 | Kuehn et al. | 290/9 |
| 4,280,087 A | * | 7/1981 | Kasiewicz | 322/28 |
| 4,495,450 A | * | 1/1985 | Tokizaki et al. | 318/138 |
| 4,616,166 A | * | 10/1986 | Cooper et al. | 318/712 |
| 4,618,811 A | * | 10/1986 | Mashino et al. | 322/28 |
| 4,633,160 A | * | 12/1986 | Graham | 322/20 |
| 4,831,322 A | * | 5/1989 | Mashino et al. | 322/28 |
| 4,914,374 A | * | 4/1990 | Iwatani et al. | 322/28 |
| 5,059,886 A | * | 10/1991 | Nishimura et al. | 322/28 |
| 5,319,299 A | * | 6/1994 | Maehara | 322/28 |
| 5,355,071 A | * | 10/1994 | Ishida et al. | 320/110 |
| 5,528,444 A | * | 6/1996 | Cooke et al. | 361/20 |
| 5,528,445 A | * | 6/1996 | Cooke et al. | 361/20 |
| 5,561,363 A | * | 10/1996 | Mashino et al. | 322/25 |
| 5,675,237 A | * | 10/1997 | Iwatani | 322/28 |
| 5,719,484 A | * | 2/1998 | Taniguchi et al. | 322/20 |
| 5,739,677 A | * | 4/1998 | Tsutsui et al. | 322/25 |
| 5,780,995 A | * | 7/1998 | Maggioni et al. | 322/8 |
| 5,886,500 A | * | 3/1999 | Iwatani et al. | 320/104 |
| 5,892,342 A | * | 4/1999 | Friedlander et al. | 318/434 |
| 6,014,016 A | * | 1/2000 | Maruyama et al. | 322/28 |
| 6,023,137 A | * | 2/2000 | Kumar et al. | 318/254 |
| 6,121,757 A | * | 9/2000 | Takahashi et al. | 322/28 |
| 6,191,562 B1 | | 2/2001 | Mueller et al. | 322/59 |
| 6,204,652 B1 | | 3/2001 | Albou et al. | 323/284 |
| 6,294,899 B1 | | 9/2001 | Tokugawa et al. | 322/28 |
| 6,420,855 B2 | * | 7/2002 | Taniguchi et al. | 322/28 |
| 6,433,519 B2 | * | 8/2002 | Taniguchi et al. | 322/28 |
| 6,462,517 B2 | * | 10/2002 | Asada | 322/28 |
| 6,566,845 B2 | * | 5/2003 | Taniguchi et al. | 322/28 |

FOREIGN PATENT DOCUMENTS

| | | |
|---|---|---|
| JP | A 2000-60191 | 2/2000 |
| JP | 1 032 110 A1 | 8/2000 |
| JP | A 2000-284837 | 10/2000 |
| JP | A 2001-69798 | 3/2001 |

* cited by examiner

Primary Examiner—Nicholas Ponomarenko
Assistant Examiner—Pedro J Cuevas
(74) Attorney, Agent, or Firm—Oliff & Berridge, PLC

(57) ABSTRACT

An automotive alternator is provided which includes a rectifier, a circulating circuit, and a controller. The circulating circuit is connected in parallel to a field winding to circulate the field current in the event that supply of the field current to a field winding is cut. The circulating circuit consists of a first circuit formed by a diode and a second circuit working to enhance attenuation of the field current. The controller works to select the second circuit when a voltage of the output of the rectifier exceeds a reference value and select the first circuit when the voltage of the output of the rectifier is less than the reference value.

12 Claims, 10 Drawing Sheets

| NUMBER OF DIODES n | FIELD CURRENT DURATION t1 (msec) |
|---|---|
| 1 | 265 |
| 3 | 168 |
| 5 | 129 |
| 10 | 84 |

Related Art

AUTOMOTIVE ALTERNATOR HAVING PARALLEL CONNECTED CIRCULATING CIRCUIT TO RAPIDLY ATTENUATE FIELD CURRENT

BACKGROUND OF THE INVENTION

1 Technical Field of the Invention

The present invention relates generally to an alternator which may be employed in automotive passenger vehicles or trucks, and more particularly to such an alternator designed to attenuate the field current within a decreased period of time, for example, in the event of a power cable joint failure.

2 Background Art

If a power cable is disconnected from an output terminal of an automotive alternator or the contact thereof is loosened, it may result in surge voltage, thus causing damage to vehicle accessories or semiconductors installed in the alternator.

Specifically, if the power cable is disconnected from the alternator or the contact thereof is loosened instantaneously, and supply of the power to a supply place such as a storage battery is cut, it will cause a no-load saturation voltage to appear at the output terminal of the alternator, thereby resulting in the surge voltage. The no-load saturation voltage continues to be generated as long as a field current is supplied to excite or magnetize field magnetic poles of the alternator.

Typical automotive alternators are driven by an internal combustion engine of the vehicle and used over a wide speed range. The alternators are required to supply an output voltage to vehicle accessories and a battery stably over the wide speed range and so designed as to generate a rated voltage within an idling speed of the engine. For instance, in automotive vehicles designed to have an idling speed of 600 rpm and a speed increasing ratio of 2.5, the speed of the alternator during the idling speed will be 1500 rpm. The alternator is designed to provide an output current of several tens amperes at a rated voltage 14V at 1500 rpm. A power generation starting speed or a rated voltage establishing speed of the alternator is, thus, set to approximately 1000 rpm.

In general, automotive alternators are one of synchronous generators, so that the voltage induced in the armature increases in proportion to the speed of magnetic poles. In automotive alternators designed to develop a rated voltage of 14V at approximately 1000 rpm, the voltage induced in the armature reaches 280V at approximately 20000 rpm that is a maximum serviceable speed. If the power cable is disconnected from the alternator, it will cause a high voltage to appear at an output terminal of the alternator as the no-load saturation voltage.

In order to avoid output of such a high voltage, automotive alternators in recent years have rectifying elements of a full-wave rectifier made of Zener diodes exhibiting the reverse breakdown. However, when the surge voltage is generated in the automotive alternator having the full-wave rectifier made up of Zener diodes, this energy is not emitted out of the alternator, but converted into thermal energy as reverse power consumed in the Zener diodes, thus causing thermal damage to the Zener diodes.

A voltage controller of the automotive alternator is designed to monitor an output voltage of the alternator. When the output voltage exceeds a reference value, the voltage controller cuts supply of field current to decrease a field magnetic flux. Alternatively, when the output voltage is below the reference value, the voltage controller permits the supply of field current to increase the field magnetic flux. Therefore, if the power cable is disconnected from the output terminal of the alternator due to an unexpected accident, so that the no-load saturation voltage appears at the output terminal, the voltage controller cuts the supply of the field current to decrease the field magnetic flux.

Usually, even after the supply of field current is cut, an inductance component exists in the field winding, which causes an excess high voltage to be produced (i.e., abrupt emission of magnetic energy), which may cause damage to the voltage controller. In order to avoid this problem, a circulating diode, as shown in FIG. 13, is used which does not attenuate the field current instantaneously when the supply of the field current is cut off, but works to circulate the field current through a closed circuit formed by the field winding and the circulating diode and converts the field current into thermal energy to attenuate it.

The current flowing at that time may be expressed quantitatively as $$V_b - V_q = L \cdot dI_f/dt + R \cdot I_f \text{ (during supply of field current } t < t_0) \quad (1)$$

$$-V_d = L \cdot dI_f/dt + R \cdot I_f \text{ (after stop of supply of field current } t > t_0) \quad (2)$$

$$I_f = (I_0 + V_d/R) \cdot \exp(-R \cdot (t-t_0)/L) - V_d/R (t > t_0) \quad (3)$$

where L is the inductance of the field winding, R is the resistance value of the field winding, $V_d$ is the forward voltage drop of the circulating diode, $I_0$ is the value of the field current immediately before the supply of the field current is stopped, and $V_q$ is the voltage drop when a power transistor working to supply and cut the field current is closed.

The behavior of the field current after the supply of the field current is stopped is expressed by a broken line b in FIG. 2(a). Specifically, the field current decreases at an exponential rate down to a final value $I_{final} = -V_d/R$ when a time constant $\tau = L/R$. However, it is impossible for the current to flow through the circulating diode in the reverse direction, so that the current flow stops when a current value I(t) reaches zero (0). Specifically, even when the power transistor is opened to stop the supply of the field current, the field current continues to flow, thereby resulting in generation of the overvoltage for a period of time, as expressed by $-(L/R) \cdot 1n(V_d/(V_d + R \cdot I_0))$ when $I_f = 0$ in Eq. (3).

Particularly, small-sized alternators in recent years tend to have a small resistance and a great inductance of the field winding, thus resulting in an increased duration of the overvoltage.

SUMMARY OF THE INVENTION

It is therefore a principal object of the invention to avoid the disadvantages of the prior art.

It is another object of the invention to provide an automotive alternator designed to attenuate the field current within a decreased period of time.

According to one aspect of the invention, there is provided an automotive alternator which comprises: (a) a rotor equipped with a plurality of field magnetic poles; (b) a first field winding working to magnetize the field magnetic poles; (c) a second field winding working to magnetize the field magnetic poles, the second field winding having a time constant shorter than that of the first field winding; (d) an armature subjected to a rotating field produced by the rotor to generate an alternating current output; (e) a rectifier converting the alternating current output from the armature into a direct current output; (f) a controller working to regulate field currents supplied to the first and second field windings to control an output voltage of the alternator; and (g) a circulating circuit connected in parallel to the first and second field windings, the circulating circuit working to circulate the field currents in the event that supply of the field currents is cut by the controller. For instance, if an excessive output voltage is developed in the event of a power cable is disconnected from the alternator, and supply of the field currents is cut, the field current flowing through the second field winding having a shorter time constant attenuates within a short period time, so that a counter-electromotive force decreases to zero (0). This causes the field current flowing through the first field winding to flow subsequently through the circulating circuit and the second field winding, so that the current having an opposite polarity flows through the second field winding, thereby attenuating magnetic fluxes intersecting the armature rapidly to eliminate the overvoltage of the alternator within a short period of time.

In the preferred mode of the invention, the circulating circuit includes a first circuit formed by a diode and a second circuit equipped with a circuit element working to enhance attenuation of the field currents. The alternator includes a selector which selects one of the first and second circuits. The controller works to control the selector to select the second circuit when a voltage of the output of the rectifier exceeds a reference value and select the first circuit when the voltage of the output of the rectifier is less than the reference value.

The second circuit is made up of a plurality of diode connected in series.

The rectifier is made of a rectifying circuit element implemented by a Zener diode. The controller selects through the selector the second circuit when the voltage of the output of the rectifier exceeds the reference value that is smaller than a zener voltage of the rectifying circuit element.

The controller switches the first circuit to the second circuit when a closed circuit including the first and second field windings is formed.

The first and second field windings are disposed coaxially.

According to another aspect of the invention, there is provided an automotive alternator which comprises: (a) a rotor equipped with a plurality of field magnetic poles; (b) a field winding supplied with a field current to magnetize the field magnetic poles; (c) an armature subjected to a rotating field produced by the rotor to generate an alternating current voltage; (d) a rectifier converting the alternating current output from the armature into a direct current output; (e) a circulating circuit including a first circuit formed by a diode and a second circuit equipped with a circuit element working to enhance attenuation of the field current, the circulating circuit being connected in parallel to the field winding to circulate the field current in the event that supply of the field current to the field winding is cut; and (f) a controller working to regulate the field current supplied to the field winding to control an output voltage of the alternator. The controller selects the second circuit when a voltage of the output of the rectifier exceeds a reference value and selects the first circuit when the voltage of the output of the rectifier is less than the reference value.

In the preferred mode of the invention, the second circuit is made up of a plurality of diode connected in series.

The diodes are implemented by a normal diode and a Zener diode joined in series in opposite directions.

The second circuit is made up of a diode and a resistor jointed in series with the diode.

The rectifier is made of a rectifying circuit element implemented by a Zener diode. The controller selects the second circuit when the voltage of the output of the rectifier exceeds the reference value that is smaller than a reverse zener voltage of the rectifying circuit element.

The controller switches the first circuit to the second circuit when a closed circuit including the field winding is formed.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2($b$) is a time chart which shows changes in field current of an alternator of the invention and a conventional alternator;

FIG. 6($b$) is a time chart which shows changes in field current flowing through a field winding of an alternator of the invention and a conventional alternator in the event of a cable joint failure;

DESCRIPTION OF THE PREFERRED EMBODIMENTS

Figure 1:
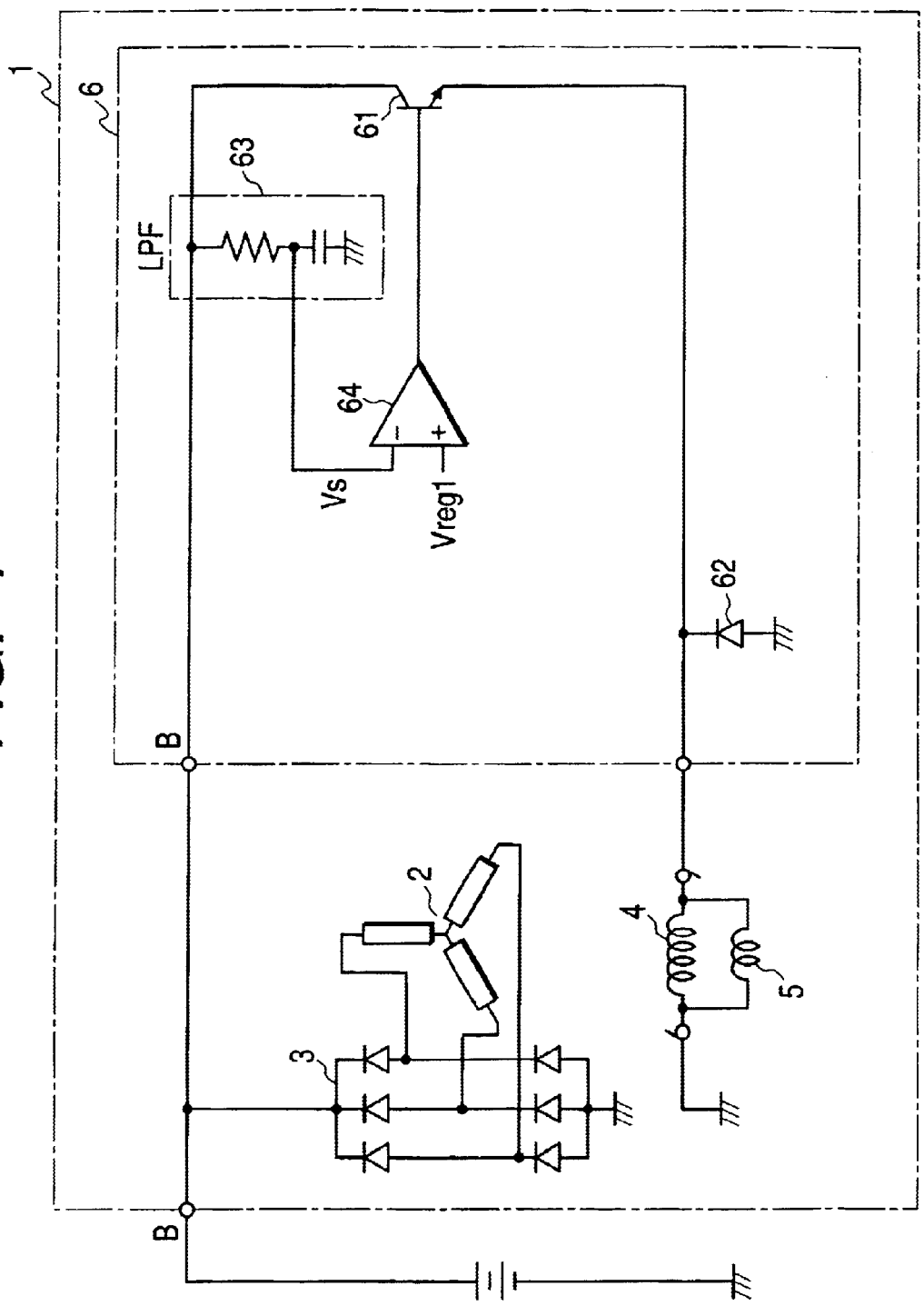
FIG. 1 is a circuit diagram which shows an automotive alternator according to the first embodiment of the invention.

Referring to the drawings, wherein like reference numbers refer to like parts in several views, particularly to FIG. 1, there is shown an automotive alternator 1 according to the first embodiment of the invention.

The alternator 1 includes an armature winding 2, a rectifier 3, field windings 4 and 5, and a voltage controller 6 and is driven by torque transmitted from an internal combustion engine of an automotive vehicle through a belt.

The armature winding 2 is a multi-phase winding (e.g., a three-phase winding) made of a coil wound around an iron core to form an armature. The armature winding 2 produces an AC output and supplies it to the rectifier 3. The rectifier 3 is implemented by a full-wave rectifier which converts the AC output of the armature winding 2 into a DC output and uses diode pairs one pair for each of phases of the armature winding 2.

The field winding 4 works to produce intersecting magnetic fluxes required to generate the voltage at the armature winding 2. The field winding 4 is made of a coil wound around field poles (not shown) to form a rotor. The field winding 5 has a time constant smaller than that of the field winding 4 and is disposed on the field poles coaxially with the field winding 4.

The voltage controller 6 works to control an electrical current (will also referred to as a field current below) applied to the field windings 4 and 5 to bring an output voltage of the alternator 1 to within a preselected range and consists of a power transistor 61, a circulating diode 62, a low-pass filter 63, and a voltage comparator 64.

The power transistor 61 is connected in series with the field windings 4 and 5 and works as a switch which supplies the field current to the field windings 4 and 5. The circulating diode 62 is connected in parallel to the field windings 4 and 5 and works to circulate the field current when the power transistor 61 is opened. The circulating diode 62 forms a circulating circuit line. The low-pass filter 63 works to remove high-frequency components from an output voltage of the alternator 1 and is formed by a CR circuit made up of a resistor and a capacitor. The voltage comparator 64 compares an output voltage of the low-pass filter 63 with a reference value Vreg1. The reference voltage Vreg1 is provided for controlling the output voltage of the alternator 1 and set to, for example, 14.5V.

In operation, when a power cable is connected firmly between the alternator 1 and a power supply such as a battery installed in the vehicle without any contact failure, the voltage comparator 64 of the voltage controller 6 works to compare the output voltage of the alternator 1 with the reference value Vreg1. If the output voltage is higher than the reference value Vreg1, the voltage comparator 64 opens the power transistor 61 to decrease the field current flowing into the field windings 4 and 5, thereby resulting in a decreased output voltage of the alternator 1. Alternatively, if the output voltage is lower than the reference value Vreg1, the voltage comparator 64 closes the power transistor 61 to increase the field current flowing into the field windings 4 and 5, thereby resulting in an increased output voltage of the alternator 1. In this way, the output voltage of the alternator 1 is so controlled as to converge at the reference value Vreg1.

If the power cable is disconnected from an output terminal B of the alternator 1 or the contact of the power cable with the output terminal B is loosened for some reason (this will be referred to as a power cable joint failure below), it will cause the alternator 1 to work to produce the power without undergoing any load, so that a high voltage is developed at the output terminal B. The output voltage of the alternator 1 is higher than the reference value Vreg1, so that the power transistor 61 is kept opened, thereby cutting the supply of the field current to the field windings 4 and 5.

Figure 2A:
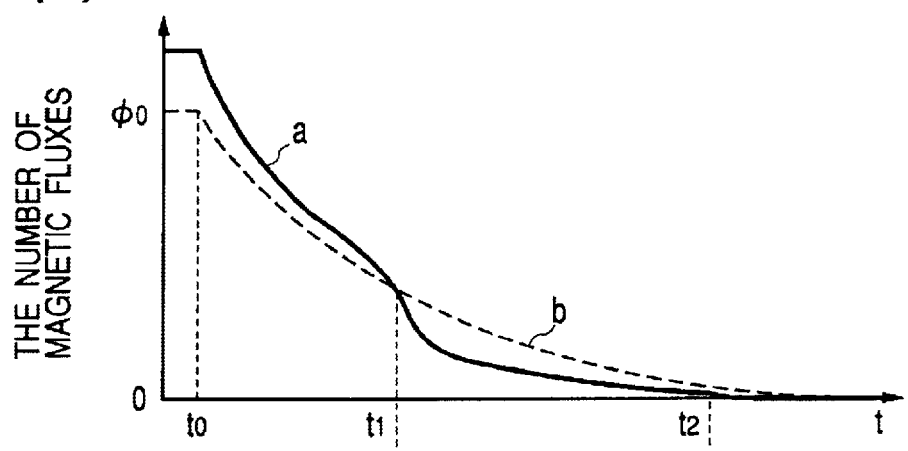
FIG. 2($a$) is a time chart which shows changes in magnetic fluxes intersecting an armature winding of an alternator of the invention and a conventional alternator.
Figure 2B:
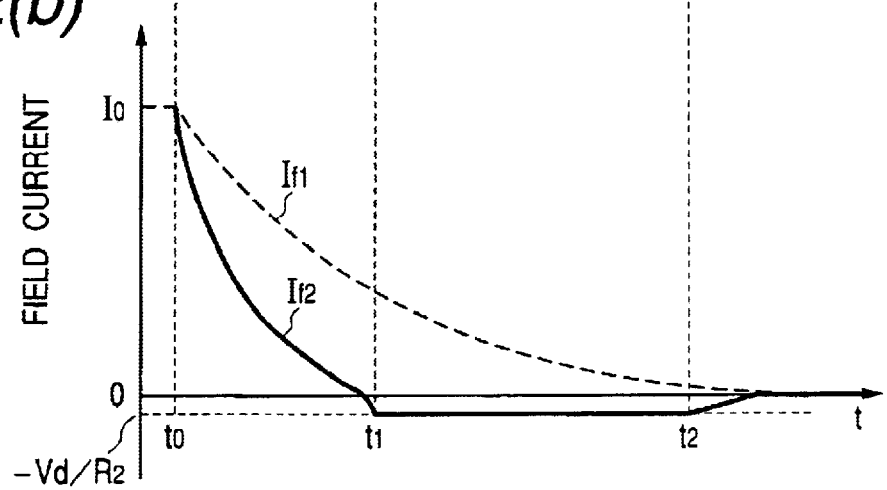
Figure 3:
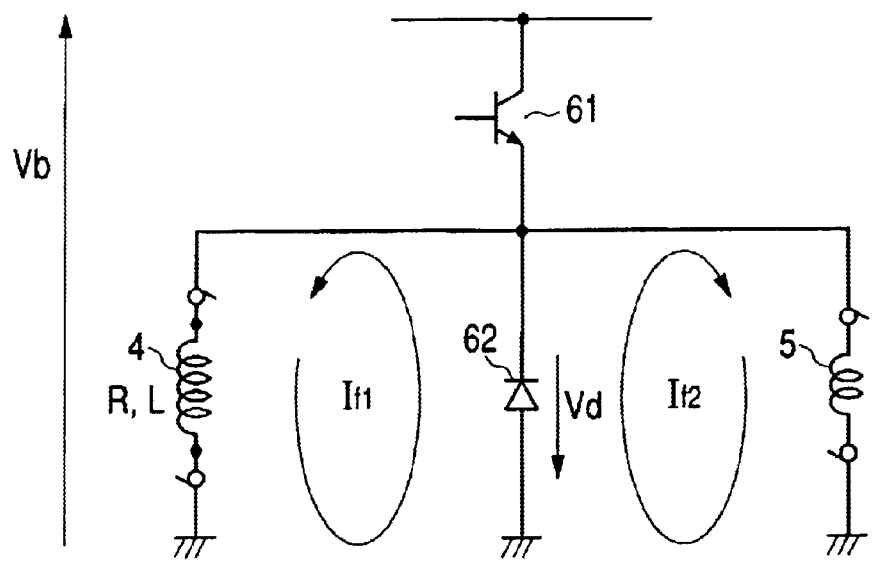
FIG. 3 is an illustration which shows flow paths of field currents in the event of a cable joint failure of an alternator.
Figure 4:
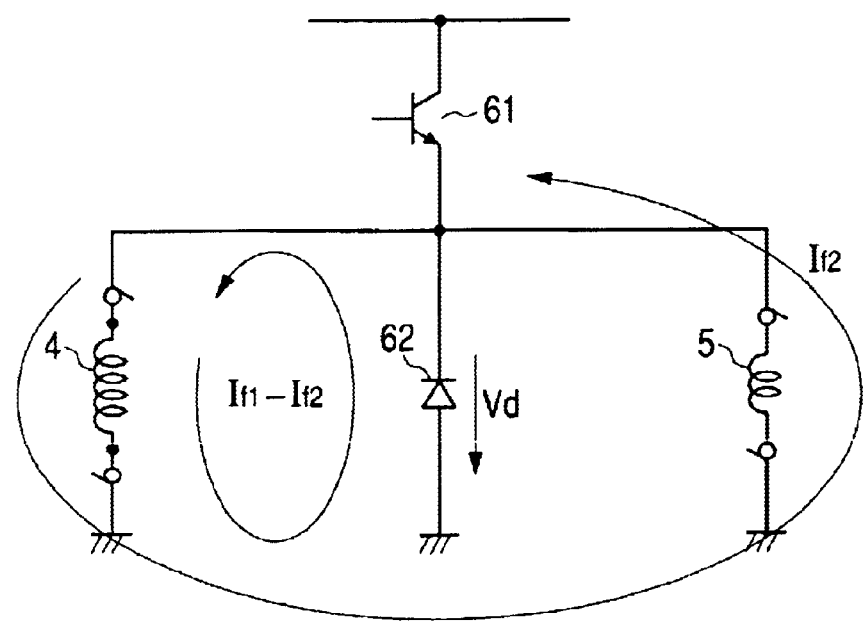
FIG. 4 is an illustration which shows flow paths of field currents after a field current flowing through a field winding 5 disappears in the event of a cable joint failure of an alternator.

FIGS. 2(a) and 2(b) illustrate changes in number of intersecting magnetic fluxes and field current in the event of the power cable joint failure, respectively. In FIG. 2(a), a solid line a indicates the number of intersecting magnetic fluxes produced in the alternator 1 of this embodiment. A broken line b indicates the number of intersecting magnetic fluxes produced in a typical alternator. In FIG. 2(b), a broken line $I_{f1}$ indicates the field current flowing through the field winding 4. A solid line $I_{f2}$ indicates the field current flowing through the field winding 5. FIGS. 3 and 4 illustrate flow paths of the field currents in the event of the power cable joint failure.

When the power transistor 61 is kept opened in the event of the power cable joint failure, it will cause both the field currents $I_{f1}$ and $I_{f2}$, as shown in FIG. 3, flowing through the field windings 4 and 5 decrease, as shown in FIG. 2(b), at an exponential rate from time $t_0$ immediately following the power cable joint failure to time $t_1$. Particularly, the field winding 5 has a shorter time constant, so that the field current $I_{f2}$ attenuates rapidly.

The field currents $I_{f1}$ and $I_{f2}$ flowing through the field windings 4 and 5 during a time interval between time $t_0$ and time $t_1$ are expressed as $$I_{f1}=(I_{o1}+V_d/R_1)\cdot\exp(-R_1\cdot(t-t_0)/L_1)-V_d/R_1 \qquad (4)$$

$$I_{f2}=(I_{o2}+V_d/R_2)\cdot\exp(-R_2\cdot(t-t_0)/L_2)-V_d/R_2 \qquad (5)$$

where $L_1$ indicates the inductance of the field winding 4, $L_2$ indicates the inductance of the field winding 5, $R_1$ indicates the resistance of the field winding 4, $R_2$ indicates the resistance of the field winding 5, $V_d$ indicates a forward voltage drop of the circulating diode 62, $I_{o1}$ indicates the value of the field current flowing through the field winding 4 until the supply of the field current is stopped, and $I_{o2}$ indicates the value of the field current flowing through the field winding 5 until the supply of the field current is stopped.

When time $t_1$ is reached, the field current $I_{f2}$ flowing through the field winding 5 becomes zero (0), so that a counter-electromotive force disappears, thus causing the current, as clearly shown in FIG. 4, to flow in an opposite direction. A source of the current is the field winding 4. After time ti, the field winding 5 serves as a portion of a circulating circuit of the field winding 4. Specifically, the field current $I_{f2}$ flowing through the field winding 5 produces an magnetomotive force serving to cancel a field magnetic flux produced by the field current $I_{f1}$ flowing through the field winding 4, so that a total number of magnetic fluxes passing through the armature winding 2 decreases rapidly during the time interval between time $t_1$ and time $t_2$. The counter-electromotive force developed at the field winding 5 is fixed at the forward voltage $V_d$ of the circulating diode 62 because the circulating diode 62 is disposed adjacent the field winding 5. The reverse current flowing through the field winding 5 is, therefore, expressed by $V_d/R_2$.

The field current 12 flowing through the field winding 5 between time $t_1$ and time $t_2$ may, thus, be expressed as $$I_{f2}=-V_d/R_2 \qquad (6)$$

Note that the field current $I_{f1}$ flowing through the field winding 4 between time $t_1$ and time $t_2$ may be expressed by Eq. (4).

The number of intersecting magnetic fluxes λ passing through the armature winding 2 is given below using the field currents $I_{f1}$ and $I_{f2}$.

$$\lambda = k_1 \cdot I_{f1} + k_2 \cdot I_{f2} \quad (7)$$

Eq. (7) shows that magnetic fluxes produced by the field current flowing through the field winding 4 are cancelled by magnetic fluxes produced by the field current, as expressed by Eq. (6), flowing through the field winding 5, thereby resulting in rapid attenuation of the magnetic fluxes intersecting the armature 2.

When time $t_2$ is reached, it becomes impossible for the field winding 4 to produce a counter-electromotive force which causes electricity to flow through the circulating diode 62, so that the field current circulates only through the field winding 5 and disappears immediately. The field currents $I_{f1}$ and $I_{f2}$ flowing through the field windings 4 and 5 after time $t_2$ are $$I_{f1} = I_{f2} = I_{f2} \cdot \exp(-(R_2 + R_1) \cdot (t - t_2)/(L_1 + L_2)) \quad (8)$$

where $I_{f2}$ is the value of field current flowing through the field windings 4 and 5 at time $t_2$.

As apparent from the above discussion, the alternator 1 of this embodiment is so designed that the field current flowing through the field winding 5 having a shorter time constant attenuates rapidly so that the counter-electromotive force is reduced to zero (0) when an excessive output voltages is developed which results from the power cable joint failure, and the supply of the field currents to the field windings 4 and 5 are cut. After the reduction in counter-electromotive force to zero, the field current flowing through the field winding 4 passes through the circulating diode 62 and the field winding 5, thereby causing the current to flow through the field winding 5 which has a polarity eliminating the magnetic flux produced by the field winding 4, so that the magnetic flux intersecting the armature attenuates rapidly. This eliminates an overvoltage output of the alternator 1 quickly.

The field winding 5 has a shorter time constant, thus allowing it to be made to have a low inductance (i.e., a small number of turns of wire) and a high resistance (i.e., a small diameter of the wire). This permits a typical field circuit to be employed as it is. Specifically, it is possible to install the field winding 5 in a dead space adjacent the field winding 4, thereby permitting the alternator 1 to be constructed with a minimum change in design without increasing the overall size of the alternator 1.

Figure 5:
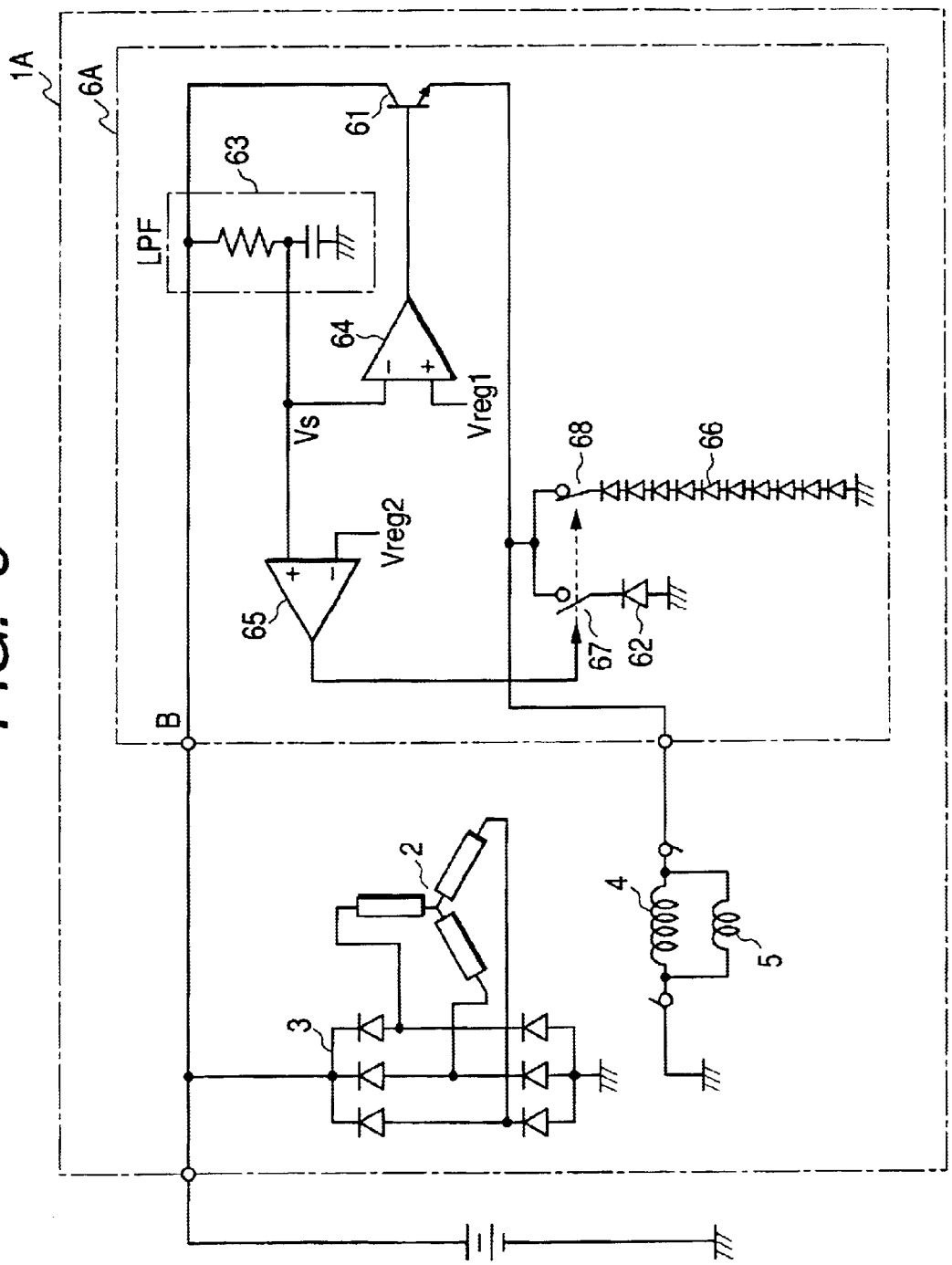
FIG. 5 is a circuit diagram which shows an automotive alternator according to the second embodiment of the invention.

FIG. 5 shows an automotive alternator 1A according to the second embodiment of the invention.

The alternator 1A includes the armature winding 2, the rectifier 3, the field windings 4 and 5, and the voltage controller 6A. The alternator 1A is different from the alternator 1 of the first embodiment only in structure of the voltage controller 6A. Other arrangements are identical, and explanation thereof in detail will be omitted here.

The voltage controller 6A consists of the power transistor 61, the circulating diode 62, the low-pass filter 63, the voltage comparators 64 and 65, the circulating circuit 66, and the switches 67 and 68. The same reference numbers as employed in FIG. 1 refer to the same parts, and explanation thereof in detail will be omitted here.

The voltage comparator 65 compares an output voltage Vs of the low-pass filter 63 with a reference value Vreg2. The reference value Vreg2 is set greater than the reference value Vreg1 used in the voltage comparator 64 to control an on-off switching operation of the power transistor 61. For instance, the reference value Vreg1 is set to 14.5V, and the reference value Vreg2 is set to 20V.

The circulating diode 66 works to facilitate attenuation of the field current and is made up of multi-joined diodes. The switches 67 and 68 serve as a selector which is responsive to an output of the voltage comparator 65 to select one of the circulating diode 62 and the circulating circuit 66. Specifically, if the output of the voltage comparator 65 is at a low level, that is, if the output voltage of the low-pass filter 63 is below the reference value Vreg2 in the absence of the power cable joint failure, only the switch 67 is closed to connect the circulating diode 62 to a line extending between the field windings 4 and 5 and the power transistor 61. Alternatively, if the output of the voltage comparator 65 is at a high level, that is, if the output voltage of the low-pass filter 63 is higher than the reference value Vreg2 in the event of the power cable joint failure, only the switch 68 is closed to connect the circulating circuit 66 to the line extending between the field windings 4 and 5 and the power transistor 61.

In operation, when the power cable is connected firmly between the alternator 1 and the power supply (i.e., in the absence of the power cable joint failure), the voltage comparator 65 remains outputting a signal of the low-level, so that the switch 67 is closed to select the circulating diode 62. The voltage controller 6A operates like the voltage controller 6 of the first embodiment to converge the output voltage of the alternator 1A on the reference value Vreg1.

Alternatively, in the event of the power cable joint failure, the alternator 1A works to produce the power without undergoing any load, so that a high voltage is developed at the output terminal B. When the output voltage of the alternator 1 becomes higher than the reference value Vreg1, it will cause the power transistor 61 to be kept opened, thereby cutting the supply of the field current to the field windings 4 and 5.

Figure 6A:
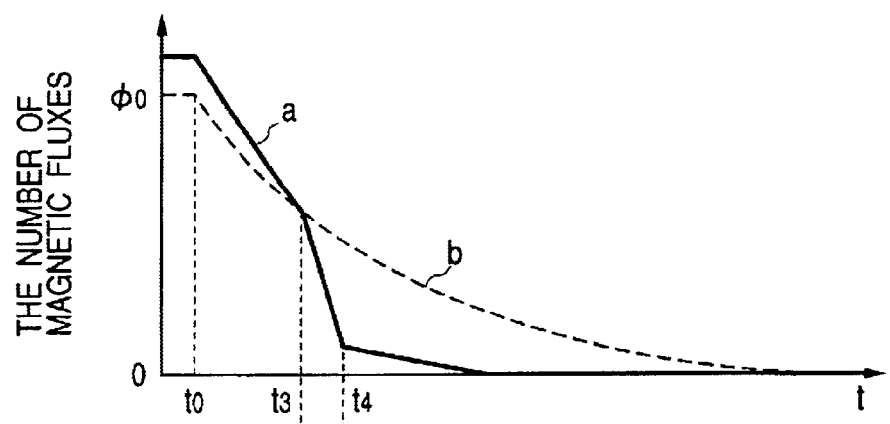
FIG. 6($a$) is a time chart which shows changes in magnetic flux intersecting an armature winding in an alternator of the invention and a conventional alternator in the event of a cable joint failure.
Figure 6B:
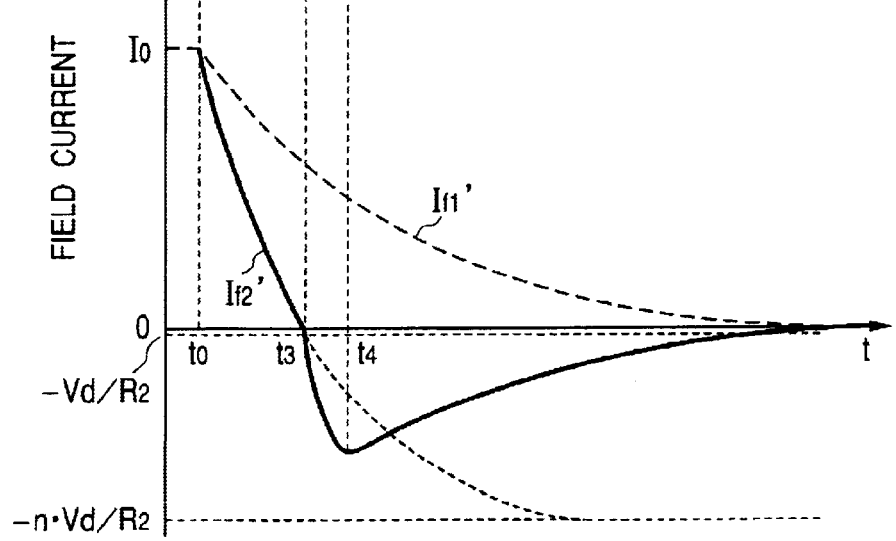

FIGS. 6(a) and 6(b) illustrate changes in number of intersecting magnetic fluxes and field current in the event of the power cable joint failure, respectively. In FIG. 6(a), a solid line a indicates the number of intersecting magnetic fluxes produced in the alternator 1A of the second embodiment. A broken line b indicates the number of intersecting magnetic fluxes produced in a typical alternator. In FIG. 2(b), a broken line $I_{f1}$ indicates the field current flowing through the field winding 4. A solid line $I_{f2}$ indicates the field current flowing through the field winding 5.

When the output voltage of the alternator 1A exceeds the reference value Vreg2 in the event of the power cable joint failure, it will cause the output of the voltage comparator 65 to change from low to high level. When the output of the voltage comparator 65 is changed to the high level, it will cause the switch 68 to be closed and the switch 67 to be opened, thereby switching the circulating diode 62 to the circulating circuit 66.

The circulating circuit 66 is, as clearly shown in FIG. 5, made up of a plurality of diodes connected in series and thus has n times the forward voltage of a single diode (n is the number of series-connected diodes), thereby causing a final value the field current reaches to be decreased greatly. This results in enhanced attenuation of the field current to eliminate the overvoltage of the alternator 1A rapidly. As the series-connected diodes of the circulating circuit 66 are increased, the voltage developed across ends of the circulating circuit 66 increases, however, the counter-electromotive force of the field winding 4 attenuates due to attenuation of the field current flowing through the field winding 4. When the counter-electromotive force produced by the field current of an opposite polarity flowing through the field winding 5 becomes identical in magnitude with the counter-electromotive force produced in the field winding 4 at time $t_4$, the field current flowing through the field winding 5 starts to attenuate even though the counter-electromotive forces do not yet reach a forward voltage drop ($n \cdot V_d$) of the circulating circuit 66. This causes the intersecting magnetic fluxes to be attenuated greatly between time $t_3$ and time $t_4$.

Between time to when the power cable joint failure has occurred and time $t_3$ when the field current $I_{f2}$, flowing through the field winding 5 has reached zero (0), the field currents $I_{f1'}$ and $I_{f2'}$ flowing through the field windings 4 and 5 are expressed as $$I_{f1'}=(I_{01}+n \cdot V_d/R_1)\cdot\exp(-R_1 \cdot (t-t_0)/L_1)-n \cdot V_d/R_1 \quad (9)$$

$$I_{f2'}=(I_{02}+n \cdot V_d/R_2)\cdot\exp(-R_2 \cdot (t-t_0)/L_2)-n \cdot V_d/R_2 \quad (10)$$

When time $t_3$ is reached, the field current $I_{f2}$, flowing through the field winding 5 becomes zero (0), so that a counter-electromotive force disappears, thus causing the current to flow in an opposite direction. A source of the current is the field winding 4. After time $t_3$, the field winding 5 serves as a portion of a circulating circuit of the field winding 4. Specifically, the field current $I_{f2}$, flowing through the field winding 5 produces an magnetomotive force serving to cancel a field magnetic flux produced by the field current $I_{f1}$, flowing through the field winding 4, so that a total number of magnetic fluxes passing through the armature winding 2 decreases rapidly during the time interval between time $t_3$ and time $t_4$. The counter-electromotive force developed at the field winding 5 increases until it reaches the forward voltage ($n \cdot V_d$) of the whole of the circulating circuit 66 because the circulating circuit 66 is disposed adjacent the field winding 5. A final value the reverse current flowing through the field winding 5 reaches is, thus, expressed by $n \cdot V_d/R_2$.

Specifically, the field current $I_{f2'}$ flowing through the field winding 5 between time $t_3$ and time $t_4$ is given by $$I_{f2'}=(n \cdot V_d/R_2)\cdot\exp(-(R_1+R_2)\cdot(t-t_3)/(L_1+L_2))-n \cdot V_d/R_2 \quad (11)$$

Note that the field current $I_{f1'}$ flowing through the field winding 4 between time $t_3$ and time $t_4$ is expressed by Eq. (9).

The number of magnetic fluxes λ intersecting the armature winding 2 may be expressed below using the field currents $I_{f1'}$ and $I_{f2'}$.

$$\lambda=k_1 \cdot I_{f1}+k_2 \cdot I_{f2'} \quad (12)$$

Eq. (12) shows that magnetic fluxes produced by the field current flowing through the field winding 4 are cancelled by magnetic fluxes produced by the field current, as expressed by Eq. (11), flowing through the field winding 5, thereby resulting in rapid attenuation of the magnetic fluxes intersecting the armature 2. Particularly, the field current $I_{f2'}$ flowing through the field winding 5, unlike the first embodiment, increases between time $t_3$ and time $t_4$, thus resulting in an increase in a portion ($k_2 \cdot I_{f2'}$) of the intersecting magnetic fluxes cancelled by the field current $I_{f2'}$.

When time $t_4$ is reached, it becomes impossible for the field winding 4 to produce a counter-electromotive force which causes electricity to flow through the circulating circuit 66, so that the field current circulates only through the field winding 5 and disappears immediately. The field currents $I_{f1'}$ and $I_{f2'}$ flowing through the field windings 4 and 5 after time $t_4$ are $$I_{f1'}=-I_{f2'}=I_{t4}\cdot\exp(-(R_2+R_1)\cdot(t-t_4)/(L_1+L_2)) \quad (14)$$

where $I_{t4}$ is the value of field current flowing through the field windings 4 and 5 at time $t_4$.

As apparent from the above discussion, the alternator 1 of this embodiment is designed to have the circulating circuit 66 made up of many diodes to decrease the final value the field current flowing through the circulating circuit 66 after stop of supply of the field current to the field windings 4 and 5 reaches, thereby resulting in a greatly decreased time required for the field current to disappear.

The switching between the circulating diode 62 and the circulating circuit 66 is achieved by using the switches 67 and 68, thus decreasing the duration of the overvoltage of the alternator 1A in the event of the power cable joint failure while ensuring the stability of the voltage control when the alternator 1A is operating normally in the absence of the power cable joint failure. The time constant of the circulating circuit is preferably longer in terms of the stability of the output voltage of the alternator 1A. The field current is, thus, circulated through the circulating diode 62 in the absence of the power cable joint failure. In the event of the power cable joint failure, the time constant of the circulating circuit is preferably shorter in order to accelerate the attenuation of the field current and resulting intersecting magnetic fluxes. The field current is, thus, circulated through the circulating circuit 66 made up of the multi-joined diodes.

The rectifier 3 may be made up of Zener diodes instead of the diodes as illustrated, thereby enabling a rise in output voltage of the alternator to be decreased below the zener voltage, which results in decreased damage to component parts of the voltage controller.

In a case where the rectifier 3 is made up of Zener diodes in the alternator 1A of the second embodiment, the reference value Vreg2 used in the voltage comparator 65 is preferably set below the zener voltage. For example, if the zener voltage Vz is 20V, it is advisable that the reference value Vreg2 be set to 18V. This causes the circulating diode 62 to be switched to the circulating circuit 66 before the output voltage of the alternator 1A exceeds the zener voltage in the event of the power cable joint failure, thus minimizing the quantity of heat dissipating from the Zener diodes.

The alternator 1A is so designed as to drive the switches 67 and 68 simultaneously when switching the circulating diode 62 to the circulating circuit 66. Such switching is preferably performed after a closed circuit including the field windings 4 and 5 is formed temporarily. This may be achieved by closing the power transistor 61 of the voltage controller 6A for a short period of time and, at the same time, actuating the switches 67 and 68, thereby avoiding instantaneous opening of the circuit occurring at a time when the circulating diode 62 is switched to the circulating circuit 66. This avoids the surge voltage resulting from an instantaneous cut of the field current, thus eliminating the need for a protective circuit.

Figure 7:
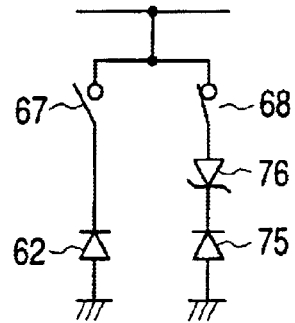
FIG. 7 is a circuit diagram which shows a modification of a circulating circuit.

The circulating circuit 66 may alternatively, as shown in FIG. 7, made up of a normal diode 75 and a Zener diode 76 joined to have opposite polarities, thereby permitting the size of a semiconductor chip to be decreased.

Figure 8:
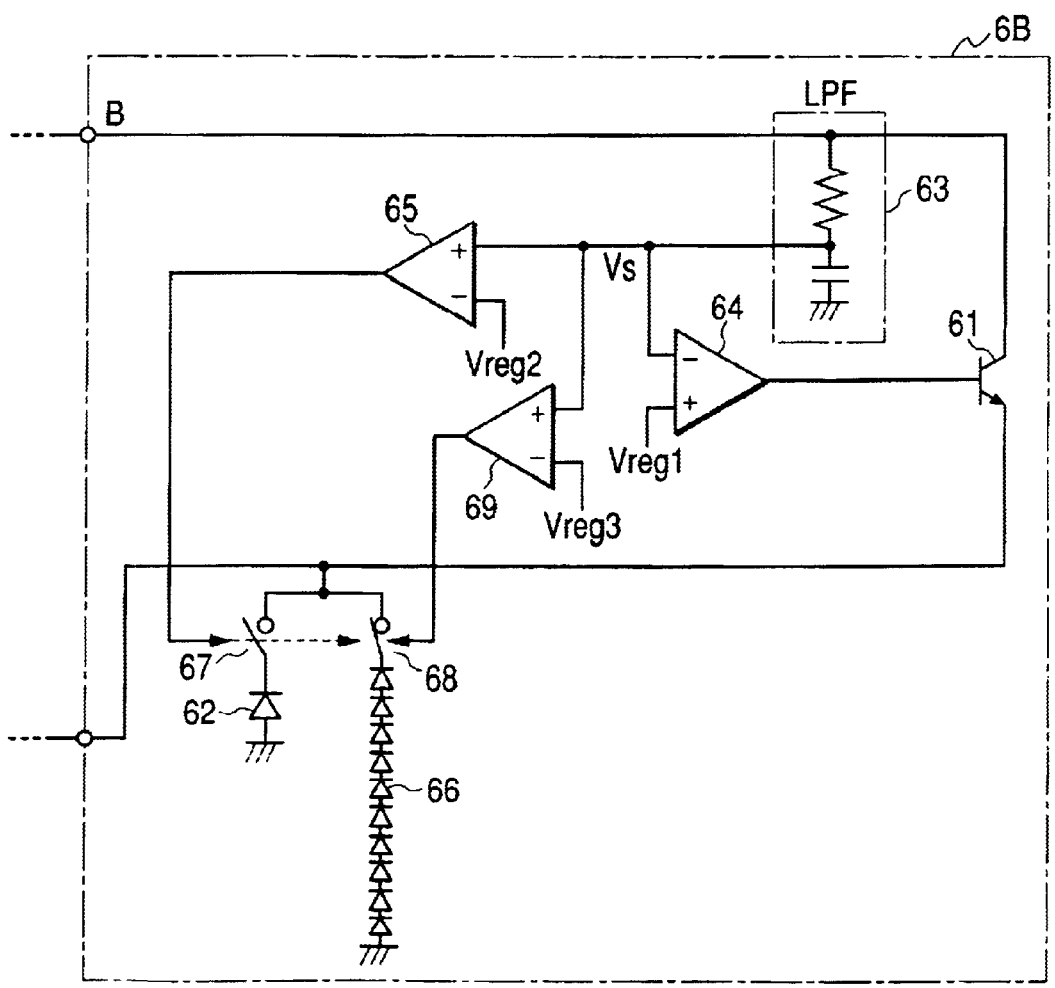
FIG. 8 is a circuit diagram which shows a modification of a voltage controller.

FIG. 8 shows a voltage controller 6B which may be employed in stead of the voltage controller 6A. The voltage controller 6B is different from the voltage controller 6A only in that a voltage comparator 69 is installed which works to control the operation of the switch 68. Other arrangements are identical, and explanation thereof in detail will be omitted here.

The voltage comparator 69 compares the output voltage Vs of the low-pass filter 63 with the reference value Vreg3 which is slightly lower than the reference value Vreg2 used in the voltage comparator 65. For instance, if the reference value Vreg2 is 20V, then the reference value Vreg3 is 19V. Therefore, when the power cable joint failure occurs, so that the output voltage of the alternator 1A rises undesirably, the output of the voltage comparator 69 is first changed to the high level, immediately after which the output of the voltage comparator 65 is changed to the high level. This causes the switches 67 and 68 to be closed simultaneously, immediately after which the switch 67 is opened, thereby resulting in temporal formation of a closed circuit including the field windings 4 and 5 at a time when the switches 67 and 68 are actuated.

Figure 9:
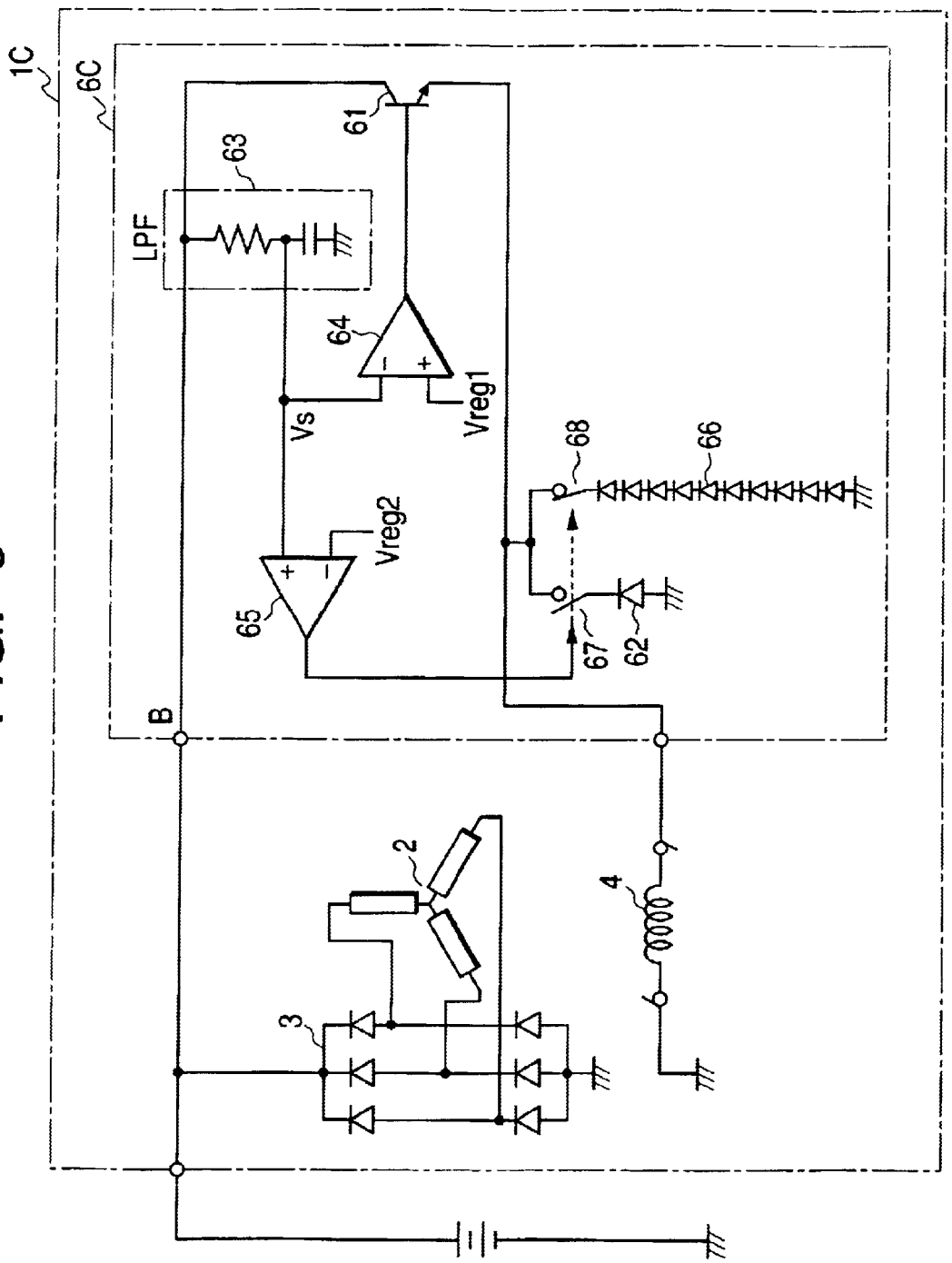
FIG. 9 is a circuit diagram which shows an automotive alternator according to the third embodiment of the invention.

FIG. 9 shows an alternator 1C according to the third embodiment of the invention which is different from the alternator 1A, as shown in FIG. 5, only in that only the field winding 4 is disposed between the power transistor 61 and ground. Other arrangements are identical, and explanation thereof in detail will be omitted here.

In operation, when the power cable is connected firmly between the alternator 1 and the power supply without any contact failure, the voltage comparator 64 of the voltage controller 6C compares the output voltage of the alternator 1C with the reference value Vreg1. If the output voltage is higher than the reference value Vreg1, the voltage comparator 64 opens the power transistor 61 to decrease the field current flowing into the field winding 4, thereby resulting in a decreased output voltage of the alternator 1C. Alternatively, if the output voltage is lower than the reference value Vreg1, the voltage comparator 64 works to close the power transistor 61 to increase the field current flowing into the field winding 4, thereby resulting in an increased output voltage of the alternator 1C. In this way, the output voltage of the alternator 1C is so controlled as to converge at the reference value Vreg1.

In the event of the power cable joint failure, the alternator 1C works to produce the power without undergoing any load, so that a high voltage is developed at the output terminal B which is greater than the reference value Vreg1, thereby causing the power transistor 61 to be kept opened, thereby cutting the supply of the field current to the field winding 4. When the output voltage of the alternator 11B exceeds the reference value Vreg2, it will cause the output of the voltage comparator 65 to be changed from low to high level. When the output of the voltage comparator 65 is changed to the high level, the switch 68 is closed, while the switch 67 is opened, thereby causing the circulating circuit to be switched from the circulating diode 62 to the circulating circuit 68.

Figures 10, 11:
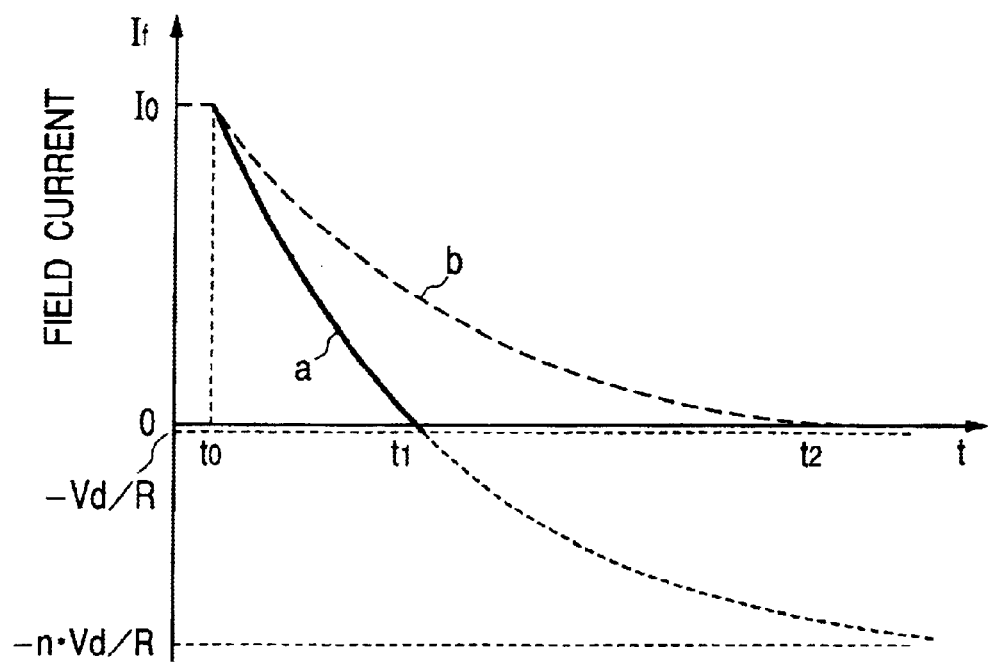
FIG. 10 is a time chart which shows changes in field current of an alternator of the third embodiment and a conventional alternator in the event of a cable joint failure.
FIG. 11 is a table listing a relation between the number of diodes forming a circulating circuit and a duration of flow of a field current.

FIG. 10 shows a change in field current flowing through the field winding 4 in the event of the power cable joint failure. A solid line a indicates the field current flowing through the field winding 4. A broke line b indicates the field current flowing through a field winding of a conventional alternator.

If the field current flowing into the field winding 4 after the circulating circuit 66 is connected to the field winding 4 in the event of the power cable joint failure is defined as $I_{f1}$, it is expressed by $$I_{f1} = (I_0 + n \cdot V_d/R) \cdot \exp(-R \cdot (t-t_0)/L) - n \cdot V_d/R \qquad (15)$$

where L is the inductance of the field winding 4, R is the resistance of the field winding 4, $V_d$ is a forward voltage drop of each diode of the circulating circuit 66, and $I_0$ is the value of the field current flowing through the field winding 4 immediately before stop of supply thereof.

As apparent from Eq. (15) and FIG. 10, the field current $I_0$ immediately before the stop of supply thereof to the field winding 4 is the same as that of the conventional alternator, however, a final value at which the field current $I_0$ is converged is decreased down to $-n \cdot V_d/R$. Specifically, the time required for the field current $I_0$ to reach the final value of $-n \cdot V_d/R$ is substantially equal to that required for the field current $I_0$ to reach a final value of $-V_d/R$ in the conventional structure in which only the circulating diode 62 is used. In other words, the time required for the field current $I_0$ to decrease to zero (0) in the alternator 1B is greatly shortened as compared with the conventional structure. The circulating circuit 66 is made up of the diodes, thus causing the field current $I_f$ to disappear at a time when it reaches zero (0) without flowing in a reverse direction.

The time $t_1$ required for the field current $I_f$ to reach zero (also referred to as a field current duration below) is expressed from Eq. (15) as $$t_1 = (-L/R) \cdot \ln(n \cdot V_d/(n \cdot V_d + R/I_0)) \qquad (16)$$

FIG. 11 is a table showing a relation between the number of diodes forming the circulating circuit 66 and the field current duration ti. Note that the table lists the field current duration ti for the case where the resistance R of the field winding 4 is 2.3 Ω, the inductance L thereof is 0.23H, the field current $I_0$ flowing immediately before the stop of supply thereof to the field winding 4 is 4.0A, and the forward voltage drop $V_d$ of each diode of the circulating circuit 66 is 0.7V. The table shows that increasing of the diodes of the circulating circuit 66 results in a great decrease in field current duration $t_1$.

Figure 12:
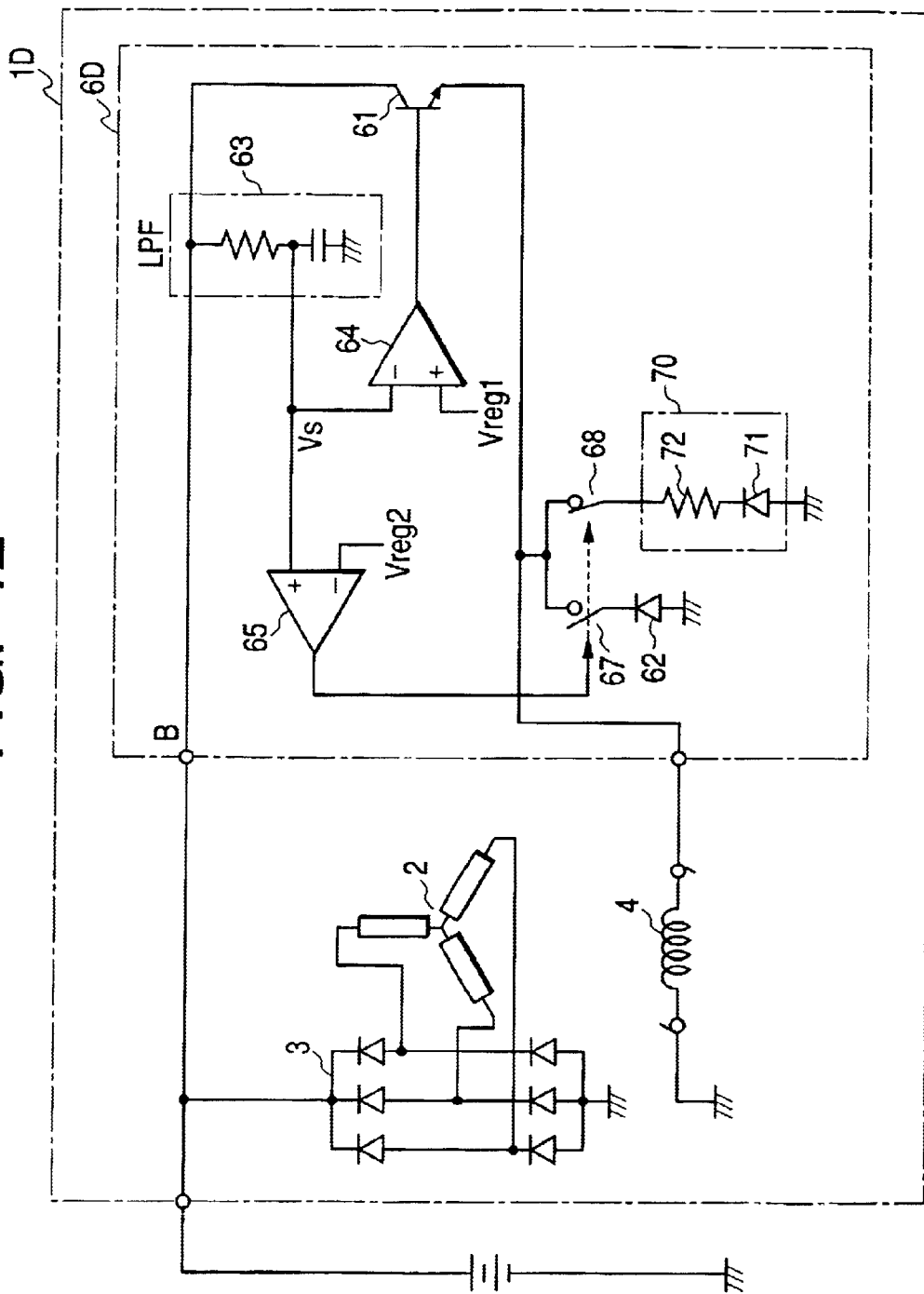
FIG. 12 is a circuit diagram which shows an automotive alternator according to the fourth embodiment of the invention.
Figure 13:
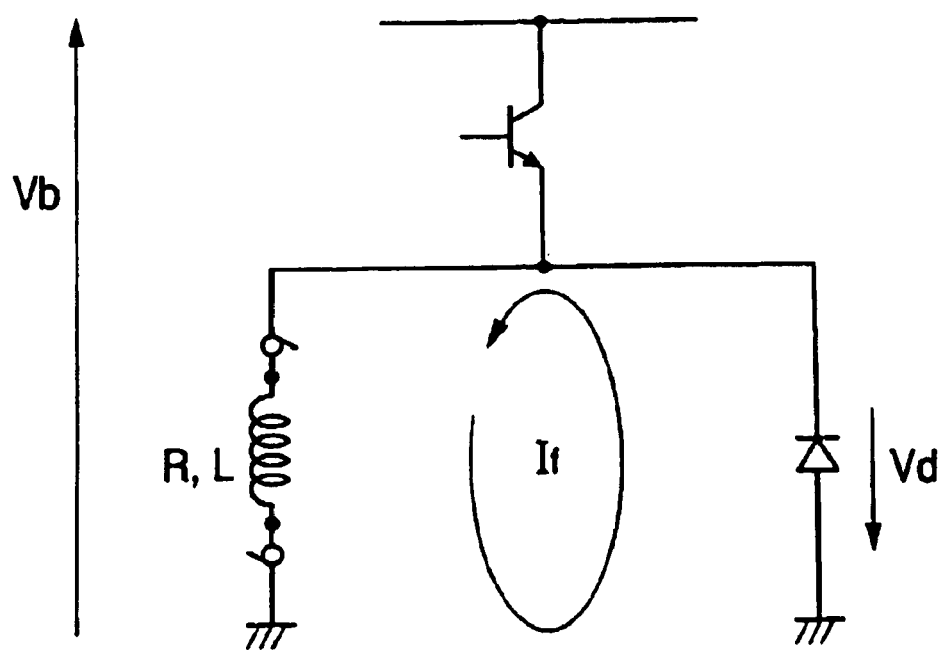
FIG. 13 is a circuit diagram which shows a part of a conventional alternator.

FIG. 12 shows an alternator ID according to the fourth embodiment of the invention which is different form the third embodiment of FIG. 9 only in structure of a voltage controller 6D. Other arrangements are identical, and explanation thereof in detail will be omitted here.

The voltage controller 6D consists of the power transistor 61, the circulating diode 62, the low-pass filter 63, the voltage comparators 64 and 65, the switches 67 and 68, and the circulating circuit 70. The same reference numbers as employed in FIG. 9 refer to the same parts, and explanation thereof in detail will be omitted here.

The circulating circuit 70 is made up of the diode 71 and the resistor 72 connected in series and works to enhance the attenuation of the field current flowing through the field winding 4 when the power transistor 61 is opened. When the circulating current flows to the diode 71, it results in a voltage drop across the resistor 72. The voltage developed between ends of the circulating circuit 70 is, thus, elevated in level as compared with when only the diode 62 is used, thereby causing the final value the field current flowing through the circulating circuit 70 reaches after the stop of supply of the field current to the field winding 4 to be decreased.

If the field current flowing into the field winding 4 after the circulating circuit 70 is connected to the field winding 4 in the event of the power cable joint failure is defined as $I_{f1}$, it is expressed by $$I_{f1} = (I_0 + V_d/(R+R_1)) \cdot \exp(-(R+R_1) \cdot (t-t_0)/L) - V_d/(R+R_1) \qquad (17)$$

where $R_1$ is the resistance of the resistor 72.

The final value the field current reaches is decreased down to $-V_d/(R+R_1)$. The attenuation time constant τ is decreased to $L/(R+R_1)$, that is, $R/(R+R_1)$ time shorter than that when the resistor 72 is not used, thereby resulting in a great decrease in time required for the field current to disappears.

The rectifier 3 in each of the third and fourth embodiments may be made up of Zener diodes instead of the diodes as illustrated, thereby enabling a rise in output voltage of the alternator to be decreased below the zener voltage, which results in decreased damage to component parts of the voltage controller.

In a case where the rectifier 3 is made up of Zener diodes in the alternator of each of the third and fourth embodiments, the reference value Vreg2 used in the voltage comparator 65 is preferably set below the zener voltage. For example, if the zener voltage Vz is 20V, it is advisable that the reference value Vreg2 be set to 18V. This causes the circulating diode 62 to be switched to the circulating circuit 66 or 70 before the output voltage of the alternator exceeds the zener voltage in the event of the power cable joint failure, thus minimizing the quantity of heat dissipating from the Zener diodes.

The resistor 72 of the circulating circuit 70, as shown in FIG. 12, may be connected in series with the diodes of the circulating circuit 66, as shown in FIG. 9, thereby resulting in further decreases in the final value the field current reaches and attenuation time constant, thus decreasing the overvoltage duration.

The alternators IC and ID are so designed as to drive the switches 67 and 68 simultaneously when switching the circulating diode 62 to the circulating circuit 66 and 70, respectively. Such switching is preferably performed after a closed circuit including the field windings 4 and 5 is formed temporarily. This may be achieved by closing the power transistor 61 for a short period of time and, at the same time, actuating the switches 67 and 68, thereby avoiding instantaneous opening of the circuit occurring at a time when the circulating diode 62 is switched to the circulating circuit 66 or 70. This avoids the surge voltage resulting from an instantaneous cut of the field current, thus eliminating the need for a protective circuit.

The circulating circuit 66 of the third embodiment may alternatively, as shown in FIG. 7, made up of the normal diode 75 and the Zener diode 76 joined to have opposite polarities, thereby permitting the time required for the field current to attenuate or disappear to be determined as a function of the zener voltage Vz of the Zener diode 76.

The voltage controller 6B, as shown in FIG. 8, may be employed in stead of the voltage controller 6C.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An automotive alternator comprising:
   a rotor equipped with a plurality of field magnetic poles;
   a first field winding working to magnetize said field magnetic poles;
   a second field winding working to magnetize said field magnetic poles, said second field winding having a time constant shorter than that of said first field winding;
   an armature subjected to a rotating field produced by said rotor to generate an alternating current output;
   a rectifier converting the alternating current output from said armature into a direct current output;
   a controller working to regulate field currents supplied to said first and second field windings to control an output voltage of the alternator; and
   a circulating circuit formed by a diode connected in parallel to said first and second field windings, said circulating circuit working to circulate the field currents in the event that supply of the field currents is cut by said controller.

2. An automotive alternator as set forth in claim 1, wherein said circulating circuit includes a first circuit formed by a diode and a second circuit equipped with a circuit element working to enhance attenuation of said field currents, further comprising a selector selecting one of the first and second circuits, and wherein said controller controls said selector to select the second circuit when a voltage of the output of said rectifier exceeds a reference value and select the first circuit when the voltage of the output of said rectifier is less than the reference value.

3. An automotive alternator as set forth in claim 2, wherein said second circuit is made up of a plurality of diode connected in series.

4. An automotive alternator as set forth in claim 2, wherein said rectifier is made of a rectifying circuit element implemented by a Zener diode, and wherein said controller selects through said selector the second circuit when the voltage of the output of said rectifier exceeds the reference value that is smaller than a zener voltage of the rectifying circuit element.

5. An automotive alternator as set forth in claim 2, wherein said controller switches said first circuit to said second circuit when a closed circuit including said first and second field windings is formed.

6. An automotive alternator as set forth in claim 1, wherein said first and second field windings are disposed coaxially.

7. An automotive alternator comprising:
   a rotor equipped with a plurality of field magnetic poles;
   a field winding supplied with a field current to magnetize said field magnetic poles;
   an armature subjected to a rotating field produced by said rotor to generate an alternating current voltage;
   a rectifier converting the alternating current output from said armature into a direct current output;
   a circulating circuit including a first circuit formed by a diode and a second circuit equipped with a circuit element working to enhance attenuation of the field current, said circulating circuit being connected in parallel to said field winding to circulate the field current in the event that supply of the field current to said field winding is cut; and
   a controller working to regulate the field current supplied to said field winding to control an output voltage of the alternator, said controller selecting the second circuit when a voltage of the output of said rectifier exceeds a reference value and selecting the first circuit when the voltage of the output of said rectifier is less than the reference value.

8. An automotive alternator as set forth in claim 7, wherein said second circuit is made up of a plurality of diode connected in series.

9. An automotive alternator as set forth in claim 7, wherein said the diodes are implemented by a normal diode and a Zener diode joined in series in opposite directions.

10. An automotive alternator as set forth in claim 7, wherein said second circuit is made up of a diode and a resistor jointed in series with the diode.

11. An automotive alternator as set forth in claim 7, wherein said rectifier is made of a rectifying circuit element implemented by a Zener diode, and wherein said controller selects the second circuit when the voltage of the output of said rectifier exceeds the reference value that is smaller than a zener voltage of the rectifying circuit element.

12. An automotive alternator as set forth in claim 7, wherein said controller switches said first circuit to said second circuit when a closed circuit including said field winding is formed.

* * * * *